United States Patent [19]
Harbaugh

[11] Patent Number: 5,802,852
[45] Date of Patent: Sep. 8, 1998

[54] BRAKE BOOSTER WITH AN INTEGRATED MASTER CYLINDER

[75] Inventor: Richard Lee Harbaugh, South Bend, Ind.

[73] Assignee: Robert Bosch Technology Corporation, Broadview, Ill.

[21] Appl. No.: 879,383

[22] Filed: Jun. 20, 1997

[51] Int. Cl.⁶ .............................. B60T 13/00; F15B 9/10
[52] U.S. Cl. ....................... 60/547.1; 91/369.7; 91/376 R
[58] Field of Search .......................... 60/547.1; 71/369.1, 71/369.2, 376 R

[56] References Cited

U.S. PATENT DOCUMENTS

| | | | |
|---|---|---|---|
| 4,409,885 | 10/1983 | Reinhartz et al. | 91/376 R |
| 5,233,911 | 8/1993 | Rossigno | 91/508 |
| 5,329,769 | 7/1994 | Wilson et al. | 60/549 |
| 5,410,880 | 5/1995 | Schluter | 60/547.1 |
| 5,475,978 | 12/1995 | Gautier et al. | 60/547.1 X |
| 5,711,152 | 1/1998 | Gautier et al. | 60/547.1 |
| 5,732,556 | 3/1998 | Schluter et al. | 60/547.1 |

*Primary Examiner*—Hoang Nguyen
*Attorney, Agent, or Firm*—Leo H. McCormick, Jr.

[57] ABSTRACT

A brake assembly (10,210,310,410) with a master cylinder totally integrated into a brake assembly. A housing for the brake assembly has an interior separated by a movable wall (30,30') to define first (32,32') and second (34,34') chambers. End element (18) secured to the housing has projection (17) located in the first chamber (32,32') with a plurality of passages (98,100) for communicating fluid to a brake system. A cylindrical member (60, 260,360,460) has a blind bore (74) that extends from a first end (70,264,364) toward a second end (72,266,366). The cylindrical member (60,260, 360,460) slidably and sealingly engages the end element (18) to connect the blind bore (74) with the plurality of passages (98,100). A reaction member (120) is located between the hub member (46) and the cylindrical member (60, 260,360,460). A resilient arrangement (80, 388,390, 488,490) urges the cylindrical member (60,260,360,460) toward the reaction member (120) to define pressurizing chambers (84,86,284,286,384,386) in the blind bore (74). The actuation force acts through the reaction member (120) to initially move the cylindrical member (60,260,360,460) into engagement with the end element (18) to terminated communication with a source of compensation fluid and establish specific flow paths between the blind bore (74) and the plurality of passages (98,100) connected to the brake system. After overcoming the force of the resilient arrangement (80,388,390,488,490), the cylindrical member (60, 260,360,460) continues to move and pressurizing fluid in chambers (84,86,284,286,384,386). This pressurized fluid is communicated through the specified flow paths to effect a brake application.

45 Claims, 6 Drawing Sheets

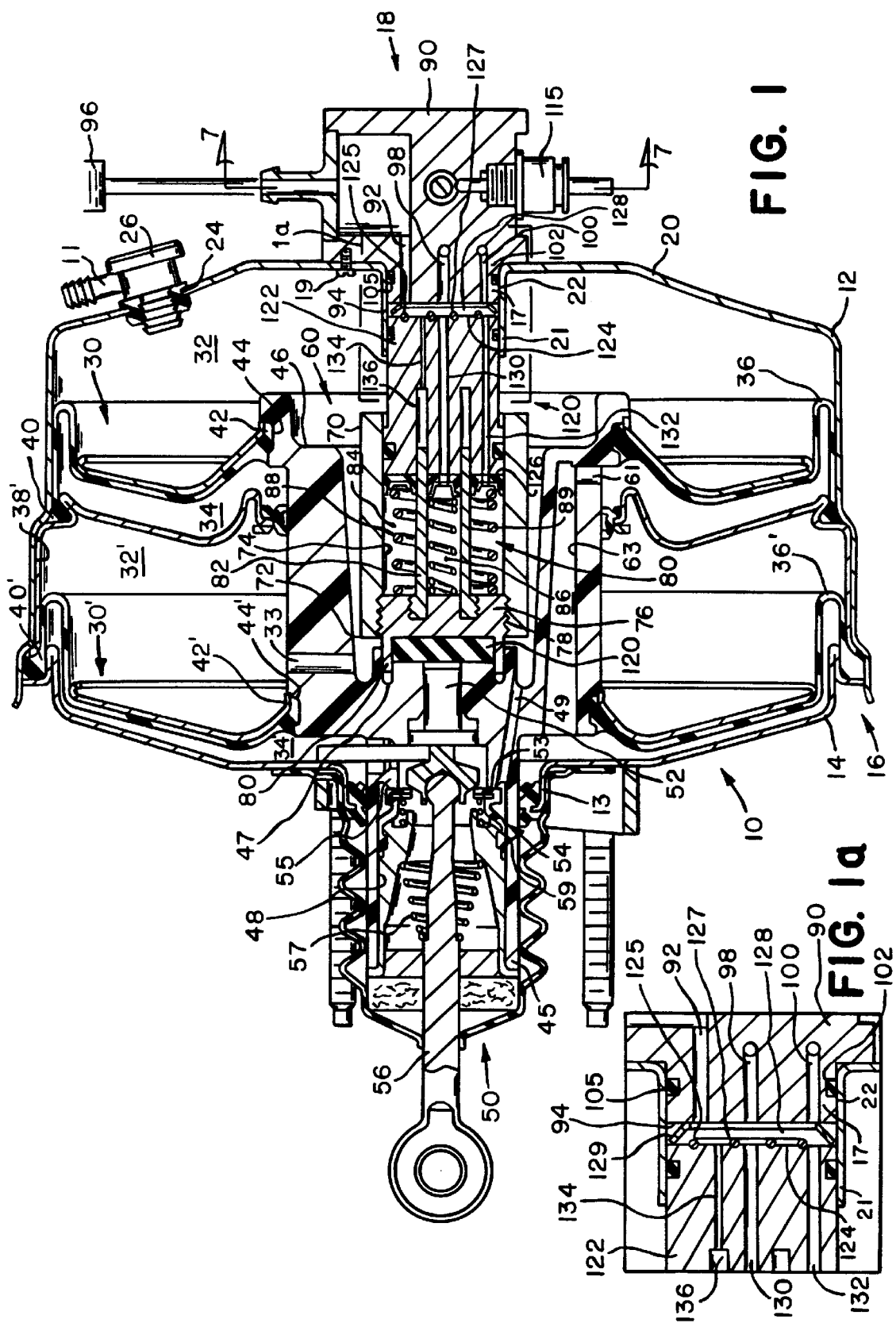

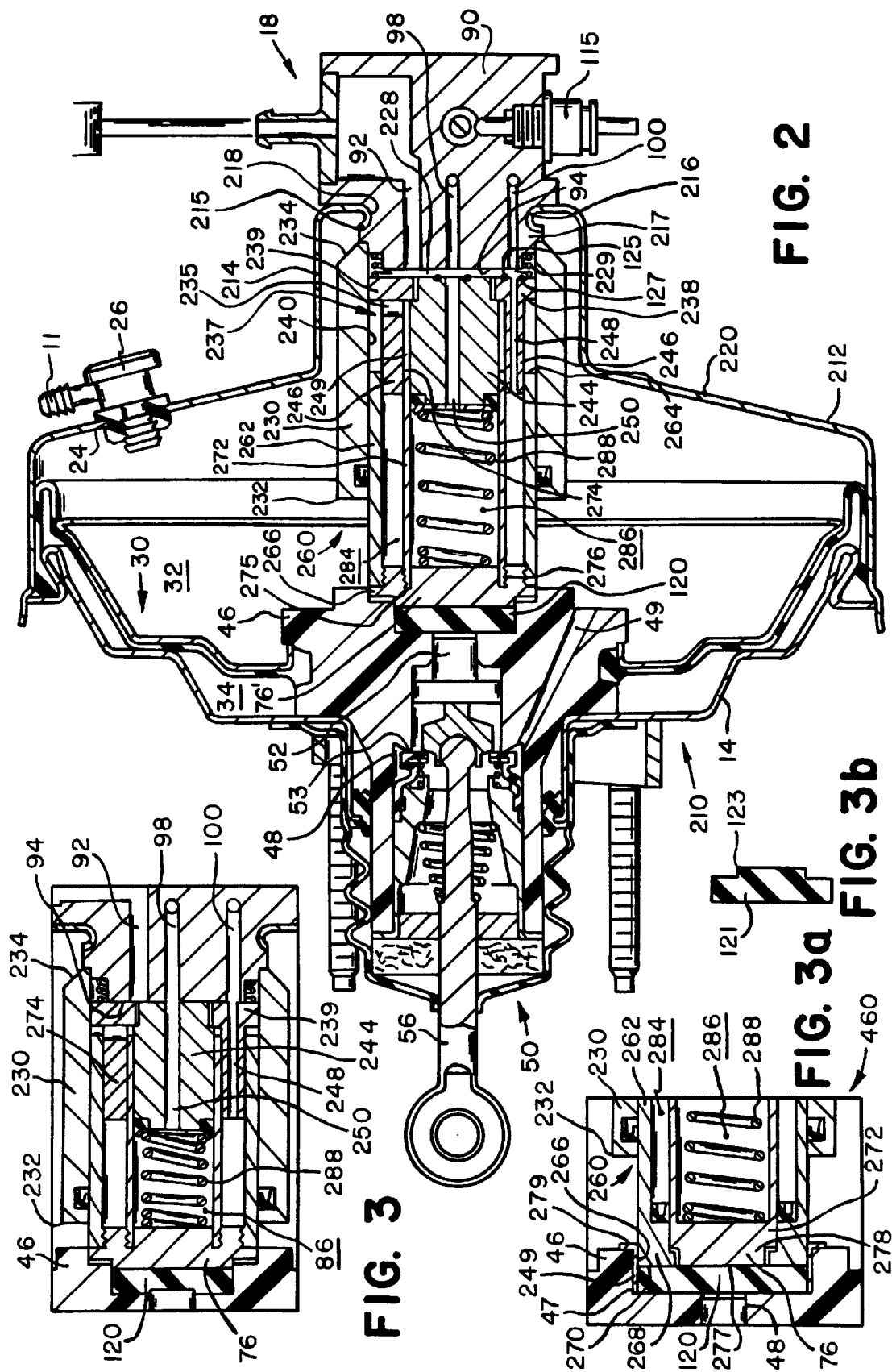

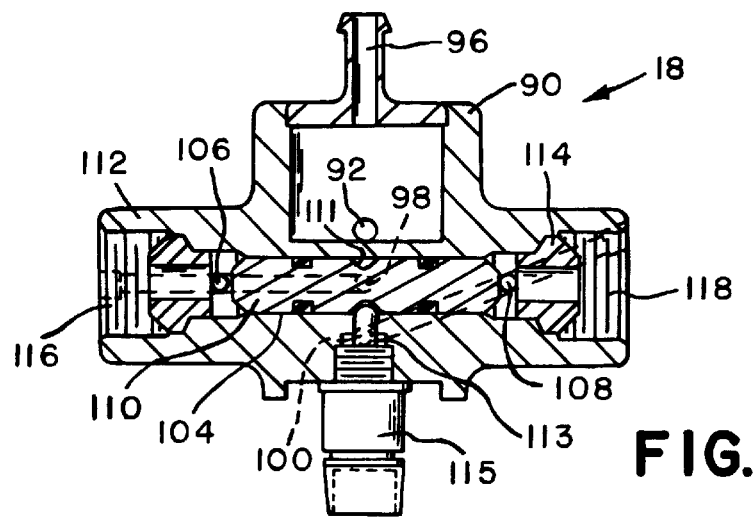
FIG. 7
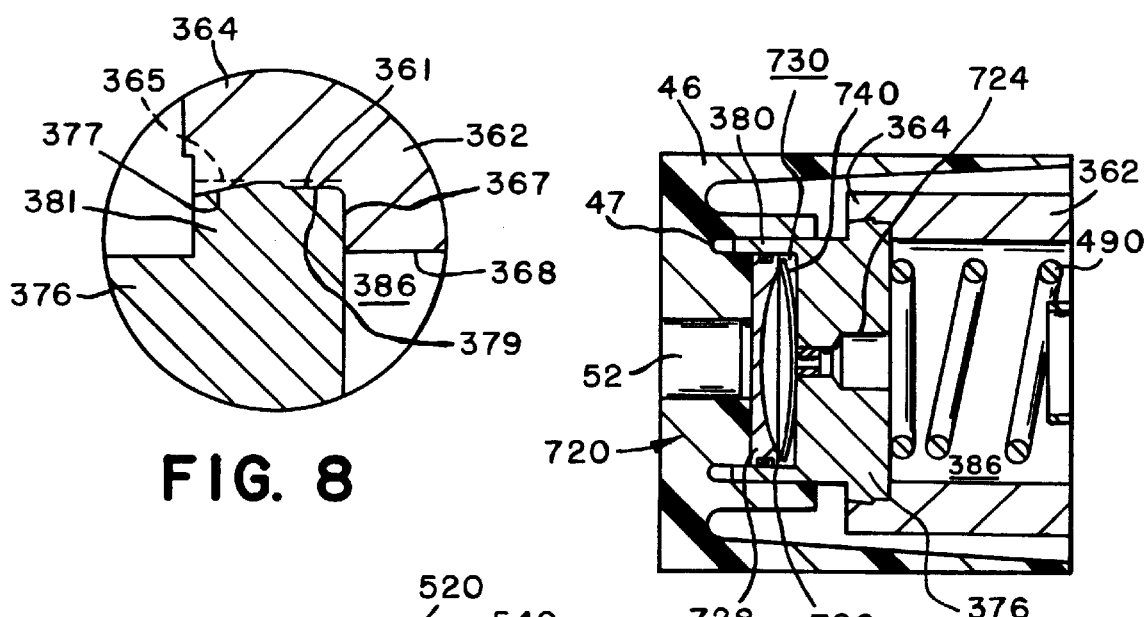
FIG. 8
FIG. 9
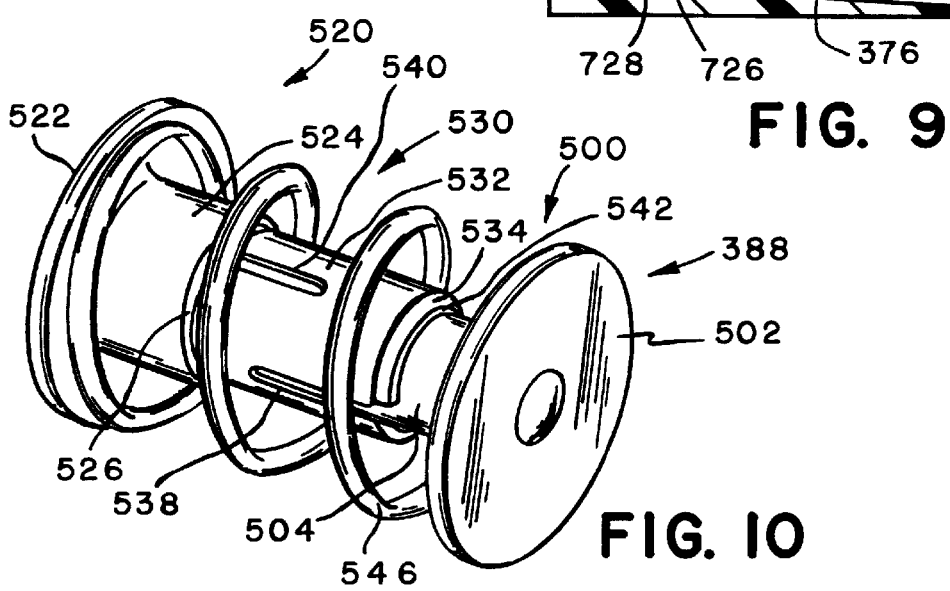
FIG. 10

BRAKE BOOSTER WITH AN INTEGRATED MASTER CYLINDER

This invention relates to a brake booster with a totally integrated master cylinder for supplying a brake system with pressurized hydraulic fluid to effect a brake application.

BACKGROUND OF THE INVENTION

U.S. Pat. No. 5,233,911 discloses a typical tandem brake booster through which a force is developed to effect a brake application. In such a brake booster, the interior is divided into first and second front chambers and first and second rear chambers by corresponding first and second walls. The first front chamber is externally connected to a first source of fluid pressure by a conduit and internally directly connected to the second front chamber and to the first and second rear chambers by various passages in a hub associated with the first and second walls. A control valve located in the hub is positioned such that the first fluid pressure is communicated in the first and second rear chambers to define a rest or ready position. In responsive to an input force, the control valve is positioned such that a second fluid pressure is presented to the first and second rear chambers to create a pressure differential across the first and second walls. This pressure differential acts on the first and second walls to develop an output force which is provided to a master cylinder to assist in effecting a brake application. On termination of the input force, a spring returns the control valve to a rest or ready position of the first mode of operation as the second fluid is evacuated from the first and second rear chambers to allow the first fluid pressure to again be present in the first and second rear chambers. This type vacuum brake booster functions in an adequate manner to provide an assist in effecting a brake application.

U.S. Pat. Nos. 4,409,885, 4,942,738 and 5,329,769 disclose brake boosters and master cylinder arrangements wherein at least a portion of the master cylinder housing is positioned within the interior of the booster housing to define an integrated brake assembly. Such brake boosters operate in a satisfactory manner but because of their overall size they still occupy considerable under the hood space when installation in a vehicle.

SUMMARY OF THE INVENTION

A primary object of the present invention is to provide a brake assembly with an integrated brake booster and master cylinder wherein the master cylindrical is totally retained in a front chamber of the brake booster to provide pressurized fluid to a brake system.

According to this invention, the interior of the housing of the brake booster is separated by a movable wall to define first and second chambers. The first chamber is connected with a first source of fluid such as vacuum produced at the intake manifold of a vehicle. The movable wall has a hub for retaining a control valve. The control valve controls the communication of the first source of fluid to the first and second chambers in a first mode of operation while in a second mode, the control valve, after terminating the communication of the first source of fluid to the second chamber, connects the second chamber with a second source of fluid, such as the air in the surrounding environment, to create a pressure differential across the movable wall. The pressure differential acts on the movable wall to develop an actuation force for pressurizing fluid which is supplied to a brake system to effect a brake application. The pressurization of the fluid occurs within the master cylinder assembly located in the first chamber and is characterized by guide structure extending from an end member which is secured to the housing of the brake assembly and located into the first chamber. The end member has an inlet passage connected to a reservoir retaining a supply of fluid and by first and second passages connected to first and second branches of the brake system. A first cylindrical member has a first end and a second end with a blind bore that extends from the first end toward said second end. The first end slidably and sealingly engages the end member which provides guidance for connecting the blind bore with the inlet passage and first and second passages in the end member. A reaction member is located between the second end and the hub member. The second end of the first cylindrical member is slidably connected with the hub member. A resilient member urges the first cylindrical member toward the reaction member to define a pressurizing chamber in the blind bore. A sleeve secured to the second end of the first cylindrical member and sealingly engaged with the end member divides the pressurizing chamber into first and second separate and independent chambers. The actuation force developed by movement of the moveable wall acts through the reaction member to initially move the first cylindrical member and exclusively connect the first and second pressurizing chambers with first and second branches of the brake system. The actuation force after overcoming the resilient member continues to move the first cylindrical member toward the end member and pressurizing fluid in the first and second pressurizing chamber. The resistance to movement of the first cylindrical member is communicated through the reaction member as a reaction force. The reaction force moves the cylindrical member toward the hub to provide an operator of an indication of the fluid pressure being supplied to the first and second branches of the brake system to effect a brake application.

An advantage of this brake assembly is provided by positioning concentric cylinders defining a master cylinder within a booster unit to reduce the overall space requirement for installation in a vehicle.

A still further advantage of this invention is provided through the total integration of a master cylinder within a brake booster to reduce the overall space requirement need to locate a brake assembly in a vehicle.

BRIEF DESCRIPTION OF THE DRAWINGS

FIG. 1 is a sectional view of an integrated brake booster and master cylinder having concentric first and second pressurizing chambers made according to the principals of the invention;

FIG. 1(a) is an enlarged sectional view of the circumscribed area 1(a) of FIG. 1 showing the relationship between the compensation cylinder and the end member;

FIGS. 2 is a sectional view of another embodiment of an integrated brake booster and master cylinder as defined in FIG. 1;

FIG. 3 is a sectional view of the relationship between the pressurizing piston, compensation cylinder and end member of FIG. 2 in an actuated mode;

FIG. 3(a) is a sectional view of structure for the pressurizing piston and reaction member for the integrated brake booster and master cylinder of FIG. 2;

FIG. 3(b) is a sectional view of another embodiment of the reaction member for the structure of FIG. 3 (a);

FIG. 7 is a sectional view of a proportional mechanism for communicating pressurized fluid from an integrated brake assembly and master cylinder;

FIG. 8 is a sectional view illustrating the mechanical joint formed between a cylindrical member and an end member;

FIG. 9 is a sectional view illustrating a hydraulic reaction mechanism for use in an integrated brake booster and master cylinder; and FIG. 10 is a prospective view of a caging mechanism for the integrated brake booster and master cylinder of FIG. 4.

DETAILED DESCRIPTION

Figure 4:
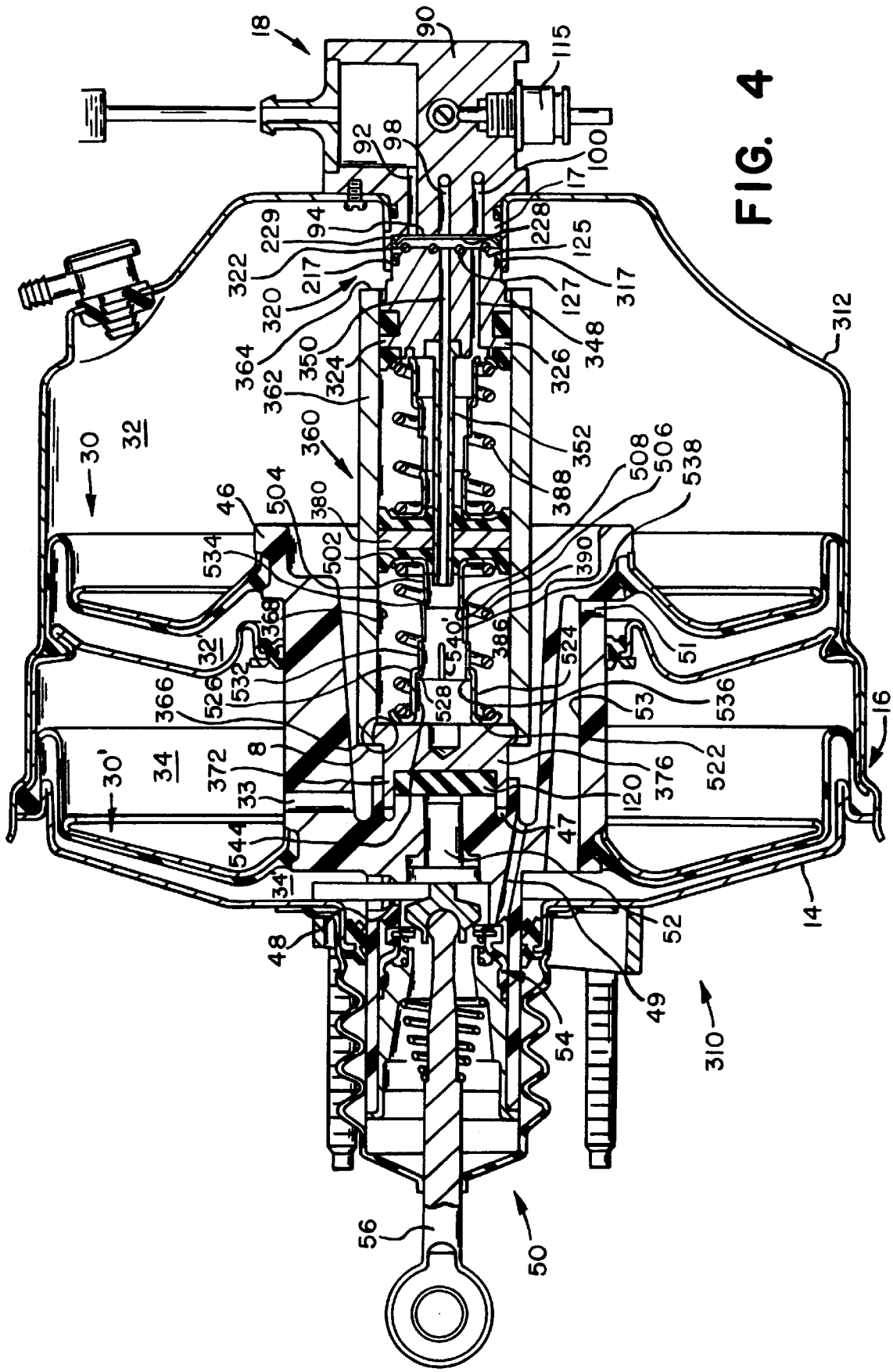
FIG. 4 is a sectional view of a further embodiment of an integrated brake booster and master cylinder having in line first and second pressurizing chambers, the size of such pressurizing chambers being defined by snap together caging mechanism associated with corresponding first and second springs.

Throughout the detailed description like components in the various embodiments of the invention are identified by the same reference numeral.

The integrated brake booster and master cylinder defined by this invention is illustrated by the brake assembly 10 in FIG. 1. The brake assembly 10 has a housing formed by joining a first shell 12 with a second shell 14 through a series of locking projections 16 (only one of which is shown). The first shell 12 has a end wall 20 with an axial opening 22 therein for receiving end means 18 through which the brake assembly 10 is connected to first and second branches of a brake system. An opening 24 in shell 12 retains a first one-way valve (check valve) 26 which is connected to an intake manifold for a vehicle. The interior of the housing is separated by a movable wall 30,30'. The movable wall 30,30' includes a diaphragm 36,36' having a first bead 40,40 which is retained against the peripheral surface 38 of the housing and a second bead 42,42' which is retained in a groove 44,44' on a hub member 46 to define first 32,32' and second 34,34' chambers within the housing. The first chamber 32,32' is permanently connected with a first source of fluid (vacuum) through the check valve 26 while the second chamber 34,34' is selective connected to the first chamber 32,32' through a bore 48 and passage 49 in hub member 46 as a function of control valve 50. The control valve 50 is located in a projection 45 which extends through an opening in housing 14 and an includes a plunger 52, a poppet assembly 54 and an input rod 56. The operation of the control valve 50 is identical to the control valve described in U.S. Pat. No. 4,953,446 and designed to function in a first mode wherein the second chamber 34,34' is connected with the first chamber 32,32' to allow free communication of the first source of fluid (vacuum) to the second chamber 34,34', as illustrated in FIG. 1, and in a second mode, after poppet face 55 engages seat 53 to terminate communication of the first source of fluid through passage 49, to connect the second chamber 34,34' with a second source of fluid (air in the surrounding environment) to create a pressure differential across the movable wall 30,30'. This pressure differential acts on the movable wall 30,30' to develop an actuation force for pressurizing fluid to effect a brake application.

The pressurizing of fluid is achieved within the brake assembly 10 through the relationship of end means 18, a first cylindrical means 60 slidably connected with the end means 18, a reaction member 120 through which an actuation force is transmitted to the first cylindrical means 60 and a resilient means 80 for positioning the movable wall 30,30' within the housing of the brake assembly 10.

The end means 18, as shown in more detail in FIGS. 1 (a) and FIG. 7, has a housing 90 secured to wall 20 of the housing 16 by bolts 19 (only one of which is illustrated). Housing 90 has an annular projection 17 which extends into the first chamber 32,32' and an inlet passage 92 for connecting a first face 94 with a reservoir 96, a first passage 98 connected to a first branch of the brake system and a second passage 100 connected with a second branch of the brake system. Housing 90 has a bore 104 which is connected with a first passage 98 through opening 106 and with the second passage 100 through opening 108. A piston 110 is located in bore 104 between a first seat 112 adjacent an outlet port 116 connected to the first branch of the brake system and a second seat 114 adjacent an outlet port 118 connected to the second branch of the brake system. The cylindrical projection 17 which extends into the first chamber 32,32' has a peripheral surface 22 with a groove 102 thereof for receiving a seal 104 to seal the first chamber 32,32' from the surrounding environment. Piston 110 has an indentation 111 located at its mid-point for receiving a contact 113 for sensor 115. When the fluid pressure supplied to bore 104 through openings 106 and 108 are substantially equal piston 110 is centered, as illustrated in FIG. 7. However should the fluid pressure as presented through either opening 106 or 108 differ, a pressure differential is created across piston 110 causing piston to move toward either seat 112 or 114 to prevent communication to the branch having the lower pressure. As piston 110 moves toward the appropriate seat 112 or 114, contact 113 moves out of indentation and activates sensor 115 to supply an indicator with an input to inform an operator of a fluid differential present in the brake system.

As shown in FIG. 1, wall 20 has a flange 21 which extends into the first chamber 32,32' and which forms a guide for linkage means 120 which connects end means 18 and first cylindrical means 60.

Linkage means 120 as shown in FIG. 1, includes a second cylindrical means 122 with a first end 124 and a second end 126. A peripheral surface adjacent the first end 124 sealingly and slidable engages a bore formed by a flange 21 on end wall 20 of shell 12 to define a compensation chamber 128 adjacent face 94 on the projection 17 on housing 90 of end means 18. The second cylindrical means 122 has a first passage 130 located along its axial plane and a second passage 132 offset from the first passage 130 both of which extends from the first end 124 to the second end 126. The second cylindrical means 122 has an annular slot 136 which extends from the second end 126 toward the first end 124 and a third passage 134 which connects the annular slot 136 with the compensation chamber 128.

The first cylindrical means 60 has an opened first end 70 and a closed second end 72 to define a blind bore 74. The blind bore 74 extends from the first end 70 toward the second end 72. The opened end 70 of the first cylindrical means 60 sealingly and slidable engages the peripheral surface of The second cylindrical means 122 to define a sealed chamber for the blind bore 74 within the first cylindrical means 60. The closed second end 72 is formed by joining an end cap 76 to the first cylindrical means 60 through a threaded connection 78. The end cap 76 has an annular projection 80 which extends into a corresponding annular groove 47 on hub member 46. A sleeve 82, which is threadably connected to end cap 76, extends into the annular slot 136 in the second cylindrical means 122 to divide the interior of the sealed chamber into a first pressurizing chamber 84 and a second pressurizing chamber 86.

Resilient means 80 consisting of a first spring 88 and a second spring 89 are respectively located in the first and second pressurizing chambers 84 and 86 to urge the first cylindrical means 60 toward the reaction means 120.

Mode of Operation of the Invention

In the brake assembly 10 when a vehicle is operating, vacuum produced at the intake manifold is communicated through conduit 11 to check valve 26. With vacuum present at check valve 26, air is evacuated from chamber 32,32' and because of the position of control valve 50 air is also evacuated from chamber 34,34' to equalize the fluid pressure in chamber 34,34' with the fluid pressure in chamber 32,32'. Fluid communication freely occurs between chamber 32 and 32' and as a result the fluid pressures therein are always identical as air can freely flow therebetween as a result of radial passage 33 in hub member 46. However the fluid communication between chamber 32 and chamber 34,34' is a function of the position of poppet valve 54 and vacuum seat 53 on the projection 45 of hub member 46 and atmospheric seat on the rear of plunger 52 as established by the input rod 56 of control valve 50.

The control valve 50, which operates in a manner as described in U.S. Pat. No. 4,953,466, has an equalization mode of operation where face 55 of poppet valve 54 is off of vacuum seat 53 and air is evacuate from chamber 34,34' by flowing from chamber 34' to chamber 34 by way of opening 61 and passage 63 in hub member 46 to bore 48 and from bore 48 around the end of plunger 52 and vacuum seat 53 to passage 49 which is connected to chamber 32. The flow of air along this flow path continues until such time as the fluid pressure in chamber 34,34' is identical with the fluid pressure in chamber 32,32' and thereafter the combined forces of return spring 57 acting on push rod 56 and valve spring 59 acting on poppet assembly 54 position poppet assembly 54 on vacuum seat 55 on projection 45 of hub 46 and atmospheric seat on the rear of plunger 52 to define a ready position or rest mode of operation for the brake assembly 10. In this rest mode of operation, fluid from reservoir 96 is freely communicated to compensation chamber 128 for presentation to the first and pressurizing chambers 84 and 86 in the first cylindrical means 60 and to the first and second branches of the brake system through end means 18.

When an operator desires to effect a brake application, an input force is applied to push rod 56 to provide linear movement for plunger 52. Initial movement of plunger 52 allows poppet spring 59 to urge the face 55 on the poppet member 54 into sealing contact with vacuum seat 53, and thereafter move atmospheric seat on the plunger 52 to move away from the poppet member 54 to allow air to flow into chamber 34,34' by way of retention key slot, passage 63 and opening 61 in hub member 46. With air present in chamber 34,34' and vacuum present in chamber 32,32', a pressure differential develops across movable wall 30,30'. This pressure differential creates an actuation force with moves the movable wall 30,30' toward end wall 20 of shell 12. Initial movement of wall 30,30' is immediately transmitted through reaction member 120 into the first cylindrical means 60. The cylindrical means 60, resilient means 80 and linkage means 120 initially move as a unit to bring seals 125 and 127 on the face of the first end 124 of cylindrical means 122 into engagement with face 94 on projection 17 of housing 90 to seal the compensation chamber 128 from flow paths established between chamber 84 and the first branch by way of passage 130 and passage 98 in end means 18 and chamber 86 and the second branch by way of passage 132 and passage 100 in end means 18. It should be understood that communication of compensation fluid from reservoir 96 is simultaneously terminated for both chambers 84 and 86 as a result pressurization of fluid therein can simultaneously begin immediately. Such pressurization begins once the second cylindrical means 122 is seated and the actuation force overcomes springs 88 and 89 to move the first cylindrical means 60 which now slides on the peripheral surface adjacent the second end 126 of cylindrical means 122 to pressurize fluid in chambers 84 and 86. During the pressurizing of the fluid in chambers 84 and 86, sleeve 82 freely moves in annular slot 136 which remains connected to compensation chamber 128. The pressurized fluid is communicated along the first and second flow paths to bore 104 in end means 1 8 for distribution through ports 116 and 118 to the first and second branches of the brake system. Piston 110 in bore 104 is responsive to the pressurized fluid as presented through openings 106 and 108 and should a difference in fluid pressure occur, piston 110 moves toward an appropriate seat 112 or 114 to restrict the flow through the corresponding outlet port 116 or 118 to assure that substantially equal fluid pressure is supplied to the brake system.

The resistance to movement of the first cylindrical means 60 during pressurization of fluid in chambers 84 and 86 creates a reaction force which acts on the second end 76 such that first cylindrical member 60 moves toward the hub member 60 causing the reaction member 120 to act on the end of plunger 52 and provide an operator with an indication of the intensity or level of the pressurized fluid being supplied to effect a brake application.

On termination of the input force to push rod 56, return springs 88 and 89 act on the second end 76 of the first cylindrical member 60 and provide a force by way of the reaction member 120 and hub member 46 to move The movable wall 30,30' toward shell 14. At the same time, push rod return spring 57 acts on and brings the atmospheric seat on plunger 52 into engagement with poppet member 54 such that poppet member 54 is off of vacuum seat 53 and air present in chamber 34,34' is evacuated to chamber 32 by way of passage 49. As movable wall 30,30' approaches a rest position, wave spring 129, see FIG. 1 (a), moves end 124 on the second cylindrical means 122 away from face 94 on projection 17 of housing 90 such that seals 125 and 127 are no longer engaged with face 94. Thereafter, fluid in compensation chamber 128 is again communicated with chambers 84 and 86 by way of passages 130 and 132 to provide for replenishment of any fluid which may be lost from the brake system and maintain the fluid level in chambers 84 and 86. The brake assembly 10 as illustrated in FIG. 1 is again in a ready mode of operation.

The brake assembly 10 of FIG. 1 is illustrated for a booster having tandem chambers 32,32' and 34,34' however for some application a booster with single chambers 32 and 34 will adequately to meet a customers requirements. The brake assembly 210 illustrated in FIG. 2 illustrates such a single booster.

In the brake assembly 210, a shell 14 is connected to shell 212 through a series of locking projections 16 to define a sealed housing. The interior of the housing is divided into a first chamber 32 and a second chamber 34 by a movable wall 30. The movable wall 30 has a hub member 46 with a bore 48 therein for retention of a control valve 50 to control communication from chamber 32 to chamber 34 by way of passage 49, vacuum seat 53, bore 48 and the retention key slot. Chamber 32 is permanently connected to the intake manifold of the vehicle through check valve 26 and functions to evacuate air from the interior of the housing. The stroke of the movable wall 30 required to develop an actuation force and supply a system with pressurized fluid is such that the end wall 220 of shell 212 has a projection or flange 214 which extends outwardly from shell 212. Projection or flange 214 has a lip 215 which is located in a groove 218 located on projection 17 extending from housing 90 of end means 18. Projection 17 has a peripheral surface which extends from face 94 to a shoulder 217 adjacent groove 218. A sleeve 230 has an opened first end 232 and a second end 234 which is fixed to the peripheral surface extending from face 94 to define a bore 240 which extends from face 94 on projection 17 of housing 90 of end means 18. Bore 240 is connected to inlet passage 92 from reservoir 96 and to passages 98 and 100 connected to the first and second branches of the brake system. A first cylindrical means 237 consisting of a first compensation disc 238 and a second compensation disc 244 is located in bore 240. The first compensation disc 238 has a base cylinder 239 with a smaller cylinder 246 extending therefrom. A passage 248 which extends from a first face to a second face is located in the smaller cylinder 246. A second compensation disc 244 concentrically located in the first compensation disc 238 has a passage 250 which extends form a first end and a second end. A spring 229 located in bore 240 acts on the first end of compensation disc 238 to urge the first and second compensation disc 238 and 244 away from face 94 on projection 17 to define compensation chamber 228.

The first cylindrical means 260 includes first and second concentric sleeve members 262 and 272 which are threadably connected to end cap 76 to define concentric first 84 and second chambers 86 within the first cylindrical means 260. Sleeve member 262 has a first end 264 and a second end 266. The sleeve 262 is concentric to and located in bore 240 with the first end 264 positioned between sleeve 230 and annular projection 246 while the second end 266 is located in bore 48 of hub member 46 and engages resilient member 120. The second sleeve member 272 has a first end 274 and a second end 275 fixed to end cap end 76. The first end 274 is slidably located in an annular slot 249 defined between annular projection 246 and compensation disc 244. The first 262 and second 272 concentric sleeves divide the extension of blind bore 240 defined by the engagement of the first cylindrical means 260 with the sleeve 230 into a first pressurizing chamber 284 and a second pressurizing chamber 286. A single return spring 288 is located in chamber 288 and acts on end cap 76 to urge face 277 and face 270 into engagement with reaction member 120 to retain the movable wall 30 to a rest position as shown in FIG. 2.

The control valve 50 as shown in FIG. 2 is positioned in a rest or first mode such that poppet member 54 engages the atmospheric seat on plunger 52 after air is evacuated from chamber 34 by way of check valve 26 to a level equal to the fluid pressure in chamber 32 as established by the vacuum level at the intake manifold. When a brake application is desired, an input force applied to push rod 56 moves plunger 52 such that poppet member 54 is seated on vacuum seat 53 and vacuum communication by way of passage 49 is terminated. Further movement of push rod 56 moves plunger 52 away from face 55 on poppet member 54 and air is thereafter communicated to chamber 34 to develop a pressure differential across movable wall 30 to create an actuation force. This actuation force is communicated through hub member 46 into reaction member 120 which acts on end cap 76 to move the first cylindrical means 260. Initial movement of cylindrical means 260 is communicated through spring 288 to move compensation disc 244 and bring seals 125 and 127 into engagement with face 94 of projection 17 to simultaneously seal passages 248 and 250 from the compensation chamber 228. Thereafter, continued movement of the first cylindrical means 260, as illustrated in FIG. 3, pressurizes fluid in chambers 284 and 288 to supply pressurized fluid through end means 18 to the first and second branches of the brake system to effect a brake application. On termination of the input force on control valve 50, the movable wall 30 is returned to the rest position shown in FIG. 2.

For some applications it may be desirable to modify the reaction force as supplied to the plunger 52 for communication to the control valve 50. The structure in FIG. 3 (a) illustrates such a reaction modification for the brake assembly of FIG. 2. In this embodiment, sleeve member 262 has a first end 264 and a second end 266. The sleeve 262 is concentric to and located in bore 240 with the first end 264 positioned between sleeve 230 and annular projection 246 while the second end 266 is located in bore 48 of hub member 46. The second end 266 has an inwardly extending lip 268 with a face 270 thereon which engages resilient member 120. The second sleeve member 272 has a first end 274 and a second end 276 with an end cap 278 on the second end 276. The first end 274 is slidably located in an annular slot 249 defined between annular projection 246 and compensation disc 244 while face 277 on end cap 278 of the second end 276 engages reaction member 120. The first 262 and second 272 concentric sleeves divide the extension of blind bore 240 defined by the engagement of the first cylindrical means 260 with the sleeve 230 into a first pressurizing chamber 284 and a second pressurizing chamber 286. A single return spring 288 is located in chamber 288 and acts on end cap 278 to urge face 277 and face 270 into engagement with reaction member 120 to return movable wall 30 to the rest position, similar to that illustrated in FIG. 2. An input force on the control valve 50 to develop the actuation force to effect a brake application by pressurizing fluid in chambers 284 and 286 is as follows. The actuation force is applied through reaction member 120 and acts on lip 268 and face 277 to simultaneously move sleeve 262 and sleeve 272. The engagement surface area of the lip 268 of the first sleeve 262 and face 277 on end cap 276 of the second sleeve 272. The resistance to movement of the first cylindrical means 260 during pressurization of fluid in chambers 284 and 288 produces a independent reaction forces which are communicated through the reaction member 120 to provide an operator with an indication of the actuation force. The areas through which the reaction force are applied to the reaction member 120 can be modified to provide independent movement can be adjusted to correspondingly modify the reaction force applied to plunger 52 to inform an operator of the intensity of the fluid pressure being supplied to effect a brake application.

In order to assure that radial forces associated with the reaction force are not directed into hub member 46 a sleeve 249 could be located in annular slot 47 in the hub member 46 as illustrated in FIG. 3 (a). In addition for some applications, it may be desirable for the reaction member 120 to have a different shape such as illustrated in FIG. 3 (b) wherein the front face of the reaction member 121 has a raised center surface 123. The center surface 123 is designed to engage face 277 on end cap 276. Now all of the initial actuation force is supplied directly to return spring 288 to provide for closure of the compensation communication and only after the reaction force resulting from the pressurization of fluid in chamber 286 communicated into the reaction member 121 is large enough to flow the reaction member into engagement with lip 268 is the actuation force communicated to the first sleeve 262 to pressurize fluid in chamber 284. This delay in communication of actuation force to pressurize fluid in chamber 284 may be selectively chosen to meet a desired braking situation such as when the first branch is connected to the front brakes and the second branch is connected to the rear brakes of a system.

For some applications it may be more desirable to utilize an in-line pressurizing master cylinder as shown in FIG. 4 for the brake assembly 310. In this embodiment, the projection on end means 18 extends into chamber 32 to define a guide and with flange (sleeve) 217 defines a bore 317. Linkage means as defined by cylindrical member 320 has a first end 322 and a second end 324 with a peripheral ledge 326 located adjacent the second end 324. Cylindrical member 320 is located in bore 317 defined by flange 317 to create a compensation chamber 228. Compensation chamber 228 is connected by inlet passage 92 to the source of fluid in reservoir 96, by passage 98 in end means 18 to the first branch of the drake system and by passage 100 in end means 18 to the second branch of the brake system. Wave spring 229 located in compensation chamber 228 urges cylindrical member 320 away from face 94 on projection 17 of end means 18 to provide free communication for fluid in the reservoir. Cylindrical member 320 has first and second passages 348 and 350 which extends from the first end 322 to the second end 324. A tube 352 attached to the second end 324 extends from the cylindrical member 320 to provide an extension for passage 350.

The first cylindrical means 360 includes a sleeve 362 with a first end 364 and a second end 366. An end member 376 is attached to the second end 366 to define a blind or second bore 368 within the first cylindrical means 360. The first end 364 surrounds and is supported by the peripheral ledge 326 to seal bore 368 from chamber 32. The second end 366 has an annular projection 372 which extends therefrom and is located in a corresponding annular slot 47 in hub member 46. Thus, both the first end 364 and the second end 366 are free to slide with respect to slot 47 and alignment ledge 326 on the peripheral surface of cylindrical member 322 such that the first cylindrical means 360 is not fixed within the brake assembly 310 but is free to functionally move axially.

A disc 380 slidable retained on tube 352 engages bore 368 to define first and second pressurizing chambers 384 and 386 within the first cylindrical means 360. Resilient means consisting of a first caged spring 388 and a second caged spring 390 act on disc 380 to establish the size of the first and second pressurizing chambers 384 and 386. Seals associated with the disc 380 and cylindrical member 320 assure that the first pressurizing chamber 384 and 386 are sealed from each other and vacuum chamber 32.

As with the embodiments illustrated in FIGS. 1 and 2, the control valve means 50 for the brake assembly 310 is responsible for communication between the first chamber 32,32' and the second chamber 34,34. In the rest or ready mode or position, the fluid pressure in chambers 32,32' and 34,34' are substantially identical as vacuum presented to chamber 32 by way of check valve 26 evacuates air to the fluid pressure level of the intake manifold. When it is desirable to make a brake application, an input is applied to the control valve 50 which initially moves to permit face 55 on poppet member 54 to engage seat 53 and interrupt communication of vacuum from chamber 32 toward chamber 34 and thereafter allows air to flow from the environment to chamber 34,34' and create a pressure differential with vacuum present in chamber 32,32'. This pressure differential creates an actuation force which is communicated through hub member 46 into reaction member 120 to act on end member 376. The first cylindrical means 360 and cylindrical member 320 move as a unit to bring seals 125 and 127 into engagement with face 94 to simultaneously isolate passages 348, 100 and 350, 98 from the compensation chamber 228. When the actuation force exceeds the force of springs 388 and 390, sleeve 362 slides on peripherial ledge adjacent end 326 to pressurize fluid in chambers 384 and 386. This pressurized fluid is communicated to the first and second branches of the brake system through end means 18 to effect a brake application. On completion of a brake application, springs 388 and 390 move the movable wall 30,30' to the rest position as shown in FIG. 4 and wave spring 329 moves cylindrical member 320 away from face 94 to again provide communication between compensation chamber 228 and the first and second chambers 384 and 386 and the first and second branches of the brake system to provide compensation fluid for the brake system.

The mechanical sealing that is created for the connection between the second end 364 of sleeve. 362 and end cap or member 376 for the brake actuator 320 is best shown in FIG. 8. Sleeve 362 and end member 376 are separate components. A flange 379 on end member 376 is positioned in opening 365 in sleeve 362 which extends from end 364 to a shoulder 367 on sleeve 362. Sleeve 362 is held stationary and a force is applied to end 364 causing a portion of the material 377 of sleeve 362 to be displaced along a peripherial contour 381 of the flange 379. This engagement of the between end member 376 and sleeve 362 forms a mechanical seal and lock to assure fluid present in chamber 386 is not communicated into chamber 32.

The caged springs 388 and 390 located in chambers 384 and 390 to establish a specific size for chambers 384 and 388 consist of snap together parts. The parts in the caged spring are interchangeable and are intended to be easily modified to meet different size requirement for chambers wherein different fluid displacements may be desirable for brake systems. In more particular detail, each caged spring 388 and 390 are identical and only caged spring 390 is described in detail and more particularly illustrated in FIG. 10.

Caged spring 390 consists of a first button member 500 which is joined to a second button member 520 by linkage 530. The first button member 500 with a base 502 with a hollow stem 504 which extends from base 502 for a first fixed distance to an end 506. An outwardly projecting lip 508 is located on stem 504 adjacent end 506 for engagement with linkage 530. The second button member 520 has a base 522 with a hollow stem 524 which extends from base 522 a fixed distance to a second end 526. An inwardly projecting lip 528 is located on stem 524 adjacent the second end 526 for engagement with linkage 530. The linkage 530 consists of a cylindrical member 532 having a first end 534 and a second end 536. The cylindrical member 532 has a first and second slots 538,538' which extend from the first end 534 toward the second end 536 and third and fourth 540,540' slots that extend from the second and 536 toward the first end 534. The first and second slots 538,538' and third and fourth 540,540' slots being located along perpendicular and radial planes with respect to a central axis for the cylindrical member 532. The first end 534 has an inward projecting lip 542 and the second end 536 has an outward projecting lip 544. The first and second slots 538,538' and third and fourth slots 540,540' in slotted cylindrical member 532 allow the first and second ends 534 and 536 to respectively flex and respectively permit radial movement over the inward lip 508 on stem 504 and the outward lip 528 on stem 524. Lips 542 and 544 move past and thereafter return to an unflexed condition to engage the corresponding lips 508 and 528 on stems 504 and 524 to form the linkage 530 between button base 502 and button base 522. A spring 546 located between button bases 502 and 522 urge the lip pairs 542,502 and 544,522 into engagement to define the rest height for the caged spring 538. During pressurizing of fluid in a pressurizing chamber, stems 504 and 524 and cylindrical member 532 telescope into each other to permit button 502 to move toward button 524. In the assembly of the first button 500 with the second button 520 through linkage 530 to produce a caged spring 390, the parts are snapped together as spring 546 is compressed. By selectively choosing a length for cylindrical member 532 and the force desired to return the caged spring 390 to its rest condition, the operation of the brake assembly can be modified to meet a desired actuation specification.

Figure 5:
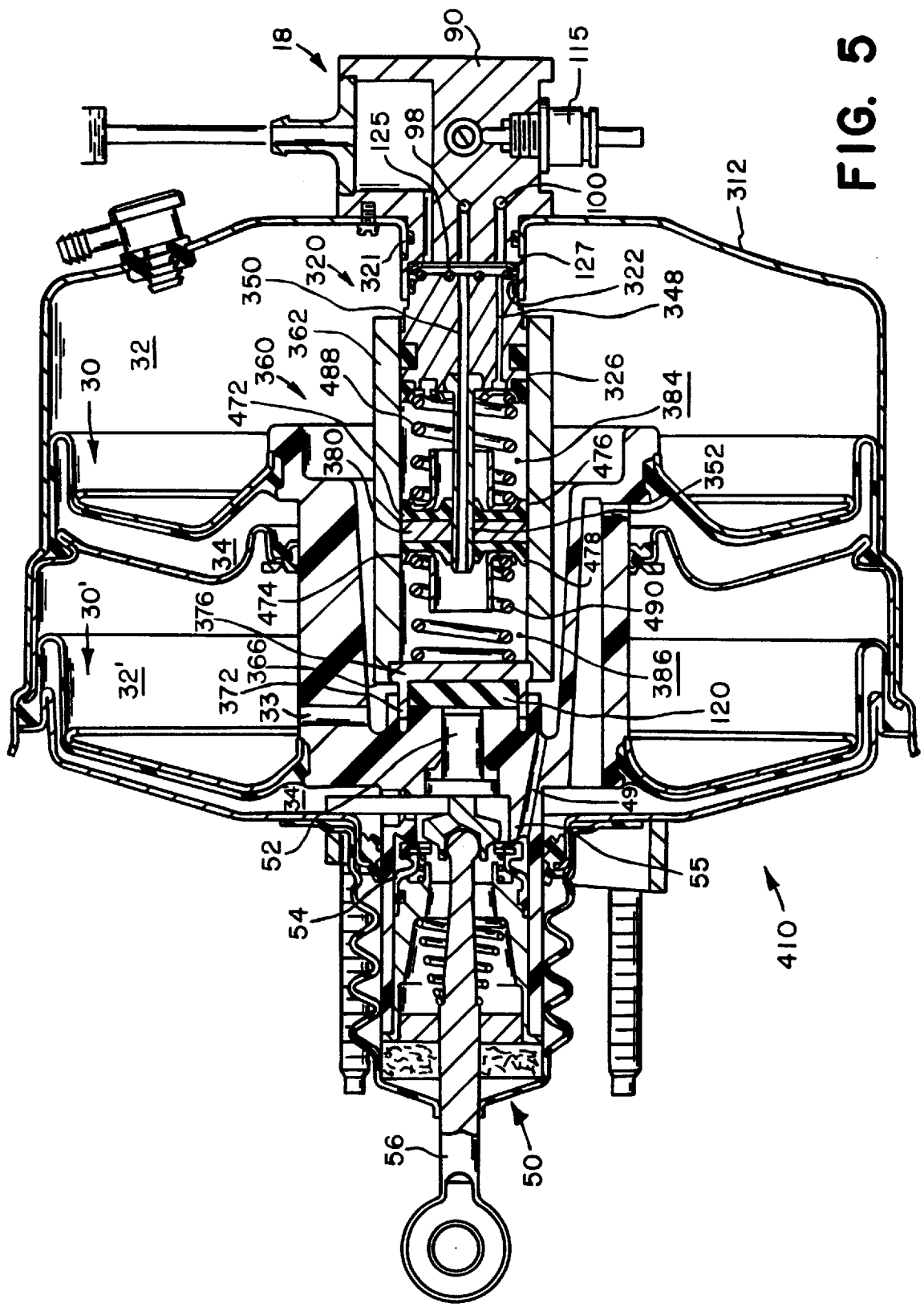
FIG. 5 is a sectional view of another embodiment of an integrated brake booster and master cylinder having in line first and second pressurizing chambers wherein the size of such pressurizing chambers is defined by springs positioning a disc on a tube within a cylindrical member.
Figure 6:
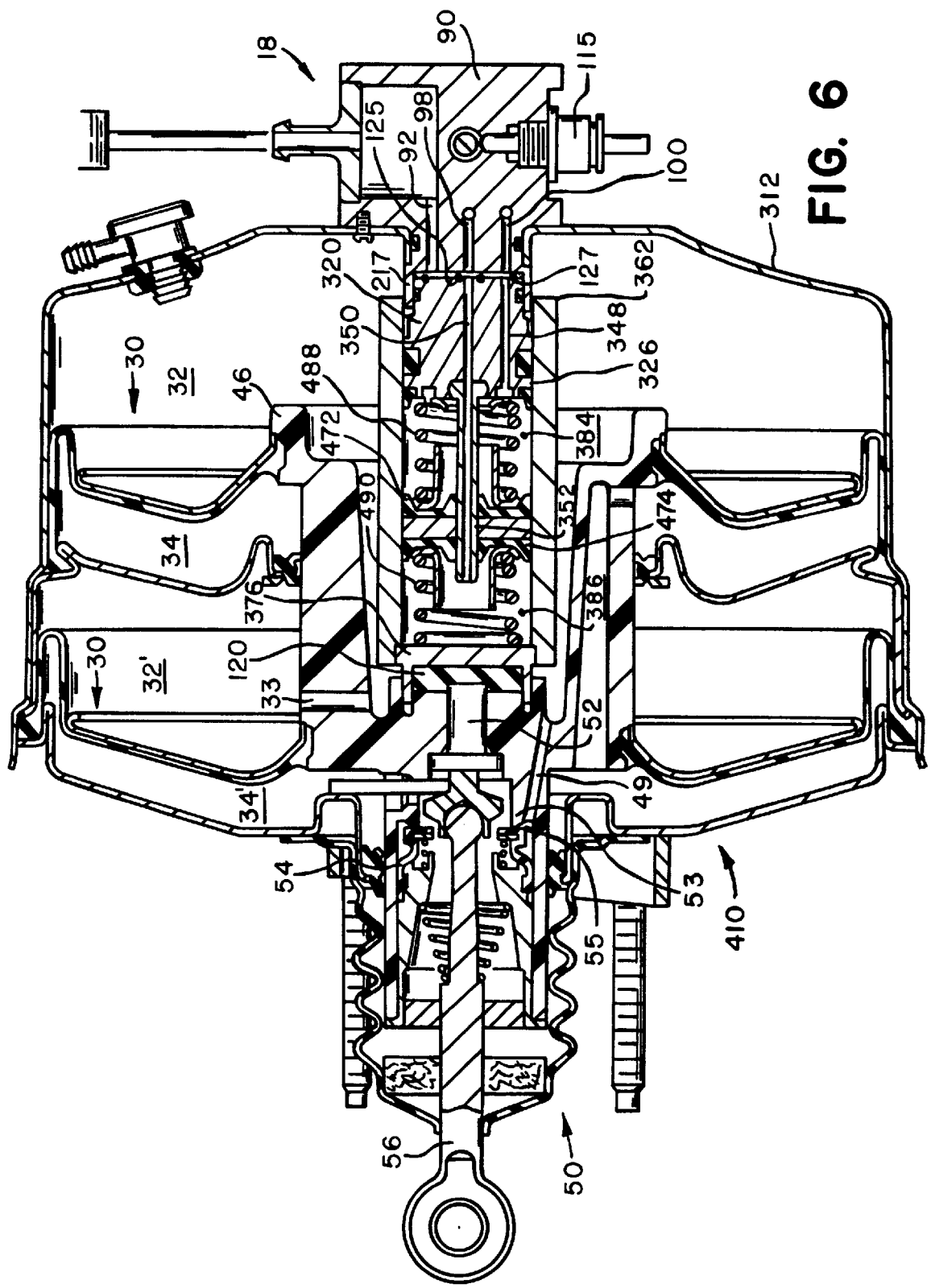
FIG. 6 is a sectional view of the integrated brake booster and master cylinder of FIG. 5 in an actuated position.

The brake assembly 410 illustrated in FIG. 5 is identical to brake assembly 310 in FIG. 4 with the exception of the un-caged return springs in the in-line pressurizing chambers 384 and 386. In the brake actuator 410 in FIG. 5, a first return spring 488 is located between disc 380 and cylindrical member 320 and a second return spring 490 is located between disc 380 and end member 376. First 472 and second 474 retention cuss are located adjacent disc 380 to hold seals 476 and 478 in place to assure the pressurizing chambers 384 and 386 are separated from one another during pressurizing of fluid therein on movement of cylindrical means 360 by the actuation force. The view in FIG. 5 is an at rest or ready mode of operation while the view in FIG. 6 is an actuation mode of operation wherein fluid pressure is supplied to the first and second branches of the brake system. In the actuation mode as shown in FIG. 6, the end 362 of the first cylindrical means 360 has slide or moved past ledge 326 and sleeve or flange 217 of end wall 312 and the flow path between chamber 384 to the first branch of the brake system and flow path between chamber 386 and the second branch of the brake system has been establish through the engagement of seals 125 and 127 with face 94 on projection 17 of end means 18 to provide pressurizing fluid to effect a brake application.

In the brake assemblies illustrated in FIGS. 4 and 5 under some operating conditions it may be desirable to have a hydraulic reaction to indicate the development of an actuator force. The structure 720 in FIG. 9 illustrates a hydraulic reaction apparatus wherein an orifice 724 is located in an opening in end member 376 to allow fluid pressure present in chamber 386 to be communicated through the end member 376. The annular projection 380 which extends from end member 376 defines a bore 726. A disc 728 is located in bore 726 and with the end member 376 defines a reaction chamber 730. Pressurized fluid in chamber 386 is communicated to reaction chamber 730 and acts on plunger 52 to provide an operator with an indication of the pressurized fluid developed as a result of movement of the first cylindrical means 360 by an actuation force. In order to modify the reaction force by providing a greater area on which the pressurizing fluid acts, disc 728 is provided with a dome surface 740.

The foregoing embodiments illustrate a series brake actuator having a master cylinder integrated into a booster housing to reduce the overall physical dimensions while providing a reduction in components and at the same time providing a more functionally responsive apparatus in accordance with an operational requirements to effect a brake application.

I claim:

1. A brake assembly comprising:

a housing formed by joining a first shell to a second shell, said first shell having a first axial opening and said second shell having a second axial opening;

an end member located in said first axial opening, said end member having first and second passages therein respectively connected to first and second brake conduits;

wall means located in said housing to define first and second chambers, said first chamber being connected to a first source of fluid, said wall means having a hub with a projection which extends through said second opening, said hub having a first bore therein connected with said first and second chambers and to a second source of fluid, said first and second fluids having different pressures;

a flange extending from said first shell for receiving said first end member and extending into said first chamber;

a cylindrical member located in said flange, said cylindrical member having a first end and a second end with a peripherial ledge located adjacent said second end, said cylindrical member having third and fourth passages that extends from said first end to said second end;

a tube extending from said second end of said cylindrical member and connected to said fourth passage;

a sleeve member having a second bore that extends from a first end to a second end, said peripherial ledge on said cylindrical member sealingly engaging said second bore;

a second end member secured to said second end of said sleeve member and slidable engaging said hub;

a disc retained on said tube and slidably engaging said second bore of said sleeve member;

spring means acting on said disc to define within said sleeve member a first pressurizing chamber between said disc and said cylindrical body and a second pressurizing chamber between said disc and said second end member, said first and second pressurizing chambers being respectively connected to said first and second brake conduits through said cylindrical member and said end member; and control valve means located in said first bore and responsive to an input force for connecting said second chamber with said second source of fluid after terminating communication of said first source of fluid present in said first chamber with said second chamber to create a pressure differential across said wall means between said first source of fluid in said first chamber and said second source of fluid in said second chamber, said pressure differential acting through said hub to communicate an actuation force to said second end member, said actuation force moving said sleeve member toward said end member to pressurize fluid in said first and second pressurizing chambers, said pressurized fluid being supplied to said first and second brake conduits to effect a brake application.

2. In a brake assembly having a housing with an interior separated by a movable wall to define first and second chambers, said first chamber being connected to receive a first source of fluid, said movable wall having a hub therein for retaining valve means, said valve means selectively connecting said second chamber with said first chamber to communicate said first source of fluid to said second chamber and said second chamber with a second source of fluid after terminating communication of said first fluid to create a pressure differential across said movable wall, said pressure differential developing an actuation force to pressurize fluid for effecting a brake application in a brake system, the improvement comprising:

a first end member secured to said housing, said first end member having first and second passages connected to said brake system;

a flange extending from said housing and with said first end member defining a first bore;

a cylindrical member slidably located in said first bore and having third and fourth passages therein which extend from a first face to a second face, said cylindrical member having a peripherial ledge adjacent said second end;

a sleeve having a second bore therein, said peripherial ledge on said cylindrical member engaging said second bore;

a tube secured to said cylindrical member and connected to said fourth passage;

a disc having an internal surface surrounding said tube and a peripherial surface engaging said second bore;

a second and member secured to said sleeve and slidingly engaging said hub; and spring means acting on said disc to define first and second pressurizing chambers within said sleeve, said actuation force being communicated from said hub to said second end member for initially moving said sleeve and cylindrical member to simultaneously connect said first pressurizing chamber to said brake system by way of said first and third passages and said second pressurizing chamber with said brake system by way of said tube and second and fourth passages, said actuation force thereafter overcoming said spring means to move said sleeve with respect to said cylindrical member to pressurize fluid in said first and second pressurizing chambers, said pressurized fluid being communicated to said brake system for effecting a brake application.

3. In a brake assembly having a housing with an interior separated by a movable wall to define first and second chambers, said first chamber being connected with a first source of fluid, said movable wall having a hub for retaining valve means, said valve means selectively connecting said second chamber with said first chamber to communicate said first source of fluid to said second chamber and said second chamber with a second source of fluid after terminating communication of said first fluid to create a pressure differential across said movable wall, said pressure differential developing an actuation force for pressurizing fluid to effect a brake application, the improvement comprising:

guide means extending from said housing and located in said first chamber, said guide means having passage means for communicating fluid to a brake system;

cylindrical means having a first end and a second end, said cylindrical means having a bore therein that extends from said first end toward said second end said guide means sealingly engaging said cylindrical means to allowing said cylindrical means to slide with respect to said guide means, said second end being slidably connected with said hub member;

reaction means located between said hub and said second end of said cylindrical means; and resilient means for urging said second end of said cylindrical means toward said reaction means to define a pressurizing chamber in said bore, said actuation force acting through said reaction means to move said cylindrical mean and after overcoming said resilient means to pressurize fluid in said pressurizing chamber, said pressurized fluid being communicated through said passages to effect said brake application.

4. In a brake assembly having a first housing with an interior separated by a movable wall to define first and second chambers, said first chamber being connected with a first source of fluid, said movable wall having a hub for retaining valve means, said valve means in a first mode responding to connect said second chamber with said first chamber to allow communication said first source of fluid to said second chamber and in a second mode responding to initially terminate communication of said first source of fluid to said second chamber and thereafter to connect said second chamber with a second source of fluid to create a pressure differential across said movable wall, said pressure differential acting on said movable wall to develop an actuation force for pressurizing fluid to effect a brake application, the improvement comprising:

guide means extending from said first housing into said first chamber, said guide means having first passage means for communicating fluid to a brake system;

first cylindrical means having a first end and a second end, said first cylindrical means having a blind bore therein that extends from said first end toward said second end, said first cylindrical means slidably and sealingly engaging said guide means for connecting said blind bore with said first passage means, said second end being slidably connected with said hub;

reaction means located between said hub and said second end of said first cylindrical means; and resilient means for urging said first cylindrical means toward said reaction means to define at least one pressurizing chamber in said blind bore, said actuation force acting through said reaction means to initially move said first cylindrical means and connect said blind bore with said first passage means and after overcoming said resilient means continue to move said first cylindrical means to pressurizing fluid in said blind bore, said pressurizing fluid being communicated through said first passage means to effect said brake application.

5. In the brake assembly as recited in claim 4 wherein said guide means including:

an end member connected to said first housing and extending into said first chamber, said first passage means being located in said end member, said end member having a first bore therein connected to said first passage means; and a second cylindrical means with a peripherial surface in sealingly engagement with said first bore and said blind bore; said second cylindrical means having second passage means therein connected to said blind bore and said first passage means.

6. In the brake assembly as recited in claim 5 wherein said guide means further includes:

an inlet passage through which fluid is supplied to said first bore to maintain a predetermined fluid level within said brake system.

7. In the brake assembly as recited in claim 5 wherein said guide means further includes:

a spring for urging said second cylindrical means away from said end member to define a compensation chamber, said compensation chamber being connected to said inlet passage and said first and second passage means to supply compensation fluid from a reservoir to said blind bore and said brake system.

8. In the brake assembly as recited in claim 7 wherein said second cylindrical means moves in said first bore to engage said end member and terminate communication from said compensation chamber to blind bore and said first and second passage means on said initial movement of said first cylindrical means by said actuation force.

9. In the brake assembly as recited in claim 7 wherein said first cylindrical means includes:

sleeve means extending from said second end and engaging said second cylindrical means for separating said blind bore into first and second pressurizing chambers, said first and second pressurizing chambers being respectively connected to said brake system through said first and second passage means.

10. In the brake assembly as recited in claim 9 wherein initial movement of said first cylindrical means moves said second cylindrical means into engagement with said end member to simultaneously terminate communication from said compensation chamber to said first and second passage means.

11. In the brake assembly as recited in claim 9 wherein said second cylindrical means includes:

an annular slot for receiving said sleeve means; and an orifice for connecting said annular slot with said compensation chamber, said orifice allowing said sleeve means to freely move in said annular slot on movement of said first cylindrical means in response to said actuation force.

12. In the brake assembly as recited in claim 4 wherein said guide means including:

an end member connected to said first housing, said first passage means and an inlet passage being located in said end member, said inlet passage being connected to a source of fluid;

a first sleeve member connected to said end member and extending from said end member into said first chamber;

second cylindrical means having a peripherial surface slidingly and sealingly engaging said first sleeve member, said second cylindrical means having a first end and a second end with second passage means therein for connected to said blind bore and said first passage means; and a spring acting on said second cylindrical means to define a flow path between said inlet passage and said first and second passage means, said flow path allowing compensation fluid to be communicated to said blind bore and brake system.

13. In the brake assembly as recited in claim 12 wherein said second cylindrical means moves in said first sleeve member in response to said initial movement of said first cylindrical means to terminate communication of compensation fluid between said inlet passage and said flow path.

14. In the brake assembly as recited in claim 13 wherein said peripherial surface on said second cylindrical means includes a ledge adjacent said second end, said ledge defining said slidably engagement for said first cylindrical means.

15. In the brake assembly as recited in claim 8 wherein said first cylindrical means includes:

a disc located in said blind bore; and resilient means for positioning said disc in said blind bore to define first and second pressurizing chambers, said first and second pressurizing chambers being connected to said second cylindrical means to define separate and independent first and second flow paths for distribution of pressurized fluid to said brake system.

16. In the brake assembly as recited in claim 15 wherein said first flow path between said second pressurizing chamber and said second cylindrical means includes:

a tube connected to said second cylindrical means and extending through said disc, said disc being moved on said tube by said resilient means in defining said first and second pressurizing chambers.

17. In the brake assembly as recited in claim 14 wherein said first cylindrical means further includes:

a second sleeve member; and a second end member, said second end member being joined to said second sleeve member to define said blind bore.

18. In the brake assembly as recited in claim 17 wherein said second end member includes a peripherial ledge which extends into a corresponding slot in said hub, said annular projection and said peripherial ledge on said second cylindrical means maintaining said first cylindrical means in axial alignment within said first chamber.

19. In the brake assembly as recited in claim 9 wherein said first cylindrical body includes:

an end member is joined to said sleeve means through a mechanical seal and lock defined by pressing said end member into an opening in said sleeve means.

20. In the brake assembly as recited in claim 4 wherein said reaction means includes:

a rubber disc through which the actuation force from said hub is communicated into said second end of said first cylindrical means, said movement of said first cylindrical means developing a resistance to said actuation force to produce a reaction force, said reaction force being communicated to said valve means to provide an operator with an indication of the actuation force being supplied to move said first cylindrical means.

21. In the brake assembly as recited in claim 18 wherein said reaction means includes:

a second disc located in an annular projection extending from said second end member to define a reaction chamber within said second end member, said pressurizing fluid developed in said first pressurizing chamber being communicated through an orifice to said reaction chamber, said pressurizing fluid acting on said valve means to provide an operator with an indication of the pressurizing fluid resulting from movement of said first cylindrical means by said actuation force.

22. In the brake assembly as recited in claim 21 wherein said second disc includes a dome surface on which said pressurizing fluid acts to provide a corresponding modified reaction force which is supplied to said valve means to indicate said actuation force.

23. In the brake assembly as recited in claim 15 wherein said resilient means includes:

a first spring and a second spring located within said blind bore to define the limits for said first and second pressurizing chambers.

24. In the brake assembly as recited in claim 23 further including:

first and second caging means for limiting the extension of said first and second springs within said blind bore.

25. In the brake assembly as recited in claim 24 where said first caging means includes:

a first button having a first base with a first stem that extends therefrom a first fixed distance to a first end, said first stem having a first lip thereon adjacent said first end, a second button having a second base with a second stem that extend therefrom a second fixed distance to a second end, said second stem having a second lip thereon adjacent said second end, said first spring being located between said first and second buttons; and a first linkage for engaging said first and second lips to connect said first button with said second button.

26. In the brake assembly as recited in claim 25 wherein said first stem, said first linkage and said second stem telescope into each other on movement of said first button toward said second button.

27. In the brake assembly as recited in claim 26 wherein said first linkage is formed from a first slotted cylindrical member, said first slotted cylindrical member having a first end and a second end with first and second axial slots extending from said first end toward said second end and third and fourth axial slots extending from said second end toward said first end, said first end having an inward projecting lip and said second end having an outward projecting lip, said first and second slots being located in a first radial plane with respect to the axis of said first slotted cylindrical member while said third and fourth slots are located in a second radial plane, said first radial plane being perpendicular to said second radial plane, said first and second slots and third and fourth slots allowing said first slotted cylindrical member to flex and permit said inward lip and said outward lip to initially move past said first lip on said first stem and said second lip on said second stem and thereafter return to an unflexed condition to engage said first and second lips to form said first linkage between said first button and said second button.

28. In the brake assembly as recited in claim 24 where said second caging means includes:

a third button having a third base with a third stem that extends therefrom a first fixed distance to a first end, said third stem having a first lip thereon adjacent said first end, a fourth button having a fourth base with a fourth stem that extend therefrom a second fixed distance to a second end, said fourth stem having a second lip thereon adjacent said second end, said second spring being located between said third and fourth buttons; and a second linkage for engaging said first and second lips to connect said third button with said fourth button.

29. In the brake assembly as recited in claim 28 wherein said third stem, said second linkage and said fourth stem telescope into each other on movement of said third button toward said fourth button.

30. In the brake assembly as recited in claim 29 wherein said second linkage is formed from a second slotted cylindrical member, said second slotted cylindrical member having a first end and a second end with first and second axial slots extending from said first end toward said second end and third and fourth axial slots extending from said second end toward said first end, said first end having an inward projecting lip and said second end having an outward projecting lip, said first and second slots being located in a first radial plane with respect to the axis of said second slotted cylindrical member while said third and fourth slots are located in a second radial plane, said first radial plane being perpendicular to said second radial plane, said first and second slots and third and fourth slots allowing said cylindrical member to flex and permit said inward lip and said outward lip to initially move past said first lip on said first stem and said second lip on said second stem and thereafter return to an unflexed condition to engage said first and second lips to form said linkage between said first button and said second button.

31. In the brake assembly as recited in claim 4 wherein said first cylindrical means includes:

a disc located in said blind bore; and resilient means for positioning said disc in said blind bore to define first and second pressurizing chambers, said first and second pressurizing chambers being connected to said guide means to define separate and independent first and second flow paths for distribution of pressurized fluid to said brake system.

32. In the brake assembly as recited in claim 31 wherein said guide means includes:

an end member having a second housing with a cylindrical projection extending into said first chamber, said cylindrical projection having a peripheral surface engaging a flange on said first housing to seal said first chamber from the surrounding environment, said second housing having a first bore therein, said pressurized fluid from said first and second flow paths being supplied to said first bore for distribution through a first port to a first branch of said brake system and a second port connected to a second branch of said brake system.

33. In the brake assembly as recited in claim 31 wherein said guide means further includes:

a piston located in said first bore;

a first seat member located in said first bore adjacent said first port; and a second seat member located in said first bore adjacent said second port, said first flow path being connected to said first bore adjacent said first seat member and said second flow path being connected to said first bore adjacent said second seat member, said pressurizing fluid being presented to said first and second branches of said brake system after respectively flowing past said first and second seat members.

34. In the brake assembly as recited in claim 33 wherein substantially equal fluid pressures present in said first and second flow paths maintains said piston in a substantially stationary position within said first bore while unequal fluid pressures cause said piston to move toward and engage one of said first and second seat member to terminate fluid communication along a flow path having a lower fluid pressure.

35. In the brake assembly as recited in claim 34 further including:

a sensor secured to said second housing of said guide means, said sensor being responsive to movement of said piston to provide a signal through which an operator is informed of a difference in the fluid pressure in said first and second flow paths.

36. In the brake assembly as recited in claim 4 wherein said guide means includes:

an end member having a second housing with a cylindrical projection extending into said first chamber, said cylindrical projection having a peripheral surface with a groove thereon for receiving a lip on a flange of said first housing to seal said first chamber from the surrounding environment, said second housing having an inlet passage connected to a reservoir for fluid, said first passage means being located in said second housing;

a first sleeve having a first end and a second end, said first end being fixed to said cylindrical projection to form a first bore, said first bore being connected to said first passage means and said inlet passage, said first cylindrical means engaging said first sleeve within said first bore to define blind bore;

a compensation cylinder located in said first bore and having a first end and a second end, said first end along with said first sleeve and said first end member forming a compensation chamber within said first bore while said second end along with said first cylindrical means forming a pressurizing chamber within said first cylindrical means, said compensation cylinder having a compensation flow path passage for connecting said compensation chamber with said pressurizing chamber and said first passage means, said compensation cylinder responding to initial movement of said first cylindrical means to close inlet passage and exclusive connect said pressurizing chamber with said first passage means.

37. In the brake assembly as recited in claim 36 wherein said compensation cylinder includes:

a first peripherial surface adjacent said first end which engages said first bore and a smaller second peripherial surface that extends into said pressurizing chamber to said second end;

an annular slot that extends from said second end toward said first end, said annular slot being connect to said compensation chamber and to said first bore through a radial opening;

second passage means for connecting said pressurizing chamber with said end member.

38. In the brake assembly as recited in claim 37 wherein said first cylindrical means further includes:

second sleeve means fixed to said second end and slidably located in said annular slot to divide said pressurizing chamber into first and second pressurizing chambers, said first chamber being connected to a first branch of said brake system and said second chamber being connected to a second branch of said brake system.

39. In the brake assembly as recited in claim 38 wherein said resilient means including:

a first spring located in said first bore for urging said cylindrical member away from said end member to establish said compensation chamber and provide a communication flow path for fluid from a source in said first mode of operation.

40. In the brake assembly as recited in claim 39 wherein said resilient means further includes:

a second spring located in said second pressurizing chamber and acting on said second end of said first cylindrical means to return said first cylindrical member to a rest position during said first mode of operation.

41. In the brake assembly as recited in claim 4 wherein said first cylindrical means includes:

a first cylindrical body having a first bore therethrough with an inwardly projecting lip adjacent said second end; and a second cylindrical body concentric to said first cylindrical body and engaging said lip, said first and second cylindrical bodies and said lip defining a first pressurizing chamber, said second cylindrical body having an end cap adjacent said second end to define a second pressurizing chamber, said reaction means simultaneously acting on said lip and end cap to pressurize fluid and effect a brake application.

42. In the brake assembly as recited in claim 41 wherein said first and second cylindrical bodies move independently with respect to each other in response to said actuation force.

43. In the brake assembly as recited in claim 42 wherein said second cylindrical body initially moves to simultaneously terminate communication with a compensation source of fluid prior to the development of pressurized fluid in the first and second pressurizing chambers in response to the actuation force.

44. In the brake assembly as recited in claim 43 wherein said reaction means includes:

a disc having a first face with first and second surfaces separated by a shoulder and a second face, said second surface engaging said end cap and said second face engaging said hub, said resistance to movement of said second cylindrical body causing said disc to flow and thereafter bring said first surface into engagement with said lip to communicate the actuation force to said first cylindrical body to transmit the actuation force through which fluid is pressurized in the first and second pressurizing chambers.

45. In a L)rake assembly having first housing with an interior separated by a movable wall to define first and second chambers, said first chamber being connected with a first source of fluid, said movable wall having a hub for retaining valve means, said valve means in a first mode responding to connect said second chamber with said first chamber to allow communication said first source of fluid to said second chamber and in a second mode responding to initially terminate communication of said first source of fluid to said second chamber and thereafter to connect said second chamber with a second source of fluid to create a pressure differential across said movable wall, said pressure differential acting on said movable wall to develop an actuation force for pressurizing fluid in a master cylinder to effect a brake application, said master cylinder being characterized by guide means extending from said housing into said first chamber, said guide means having first passage means for communicating fluid to a brake system, first cylindrical means having a first end and a second end, said first cylindrical means having a blind bore therein that extends from said first end toward said second end, said first cylindrical means slidably and sealingly engaging said guide means for connecting said blind bore with said first passage means with said second end being slidably connected with said hub, reaction means located between said hub and said second end of said first cylindrical means and resilient means for urging said first cylindrical means toward said reaction means to define said pressurizing chamber in said blind bore, said actuation force acting through said reaction means to initially move said first cylindrical means and connect said blind bore with said first passage means and after overcoming said resilient means continue to move said first cylindrical means to pressurizing fluid in said blind bore, said pressurizing fluid being communicated through said first passage means to effect said brake application.

* * * * *